US012268138B2

(12) United States Patent
Lefers et al.

(10) Patent No.: US 12,268,138 B2
(45) Date of Patent: Apr. 8, 2025

(54) LIQUID DESSICANT COOLER SYSTEM AND METHOD

(71) Applicant: KING ABDULLAH UNIVERSITY OF SCIENCE AND TECHNOLOGY, Thuwal (SA)

(72) Inventors: Ryan Michael Lefers, Thuwal (SA); Mark Alfred Tester, Thuwal (SA); TorOve Leiknes, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 1013 days.

(21) Appl. No.: 17/263,300

(22) PCT Filed: Apr. 24, 2019

(86) PCT No.: PCT/IB2019/053399
§ 371 (c)(1),
(2) Date: Jan. 26, 2021

(87) PCT Pub. No.: WO2020/026040
PCT Pub. Date: Feb. 6, 2020

(65) Prior Publication Data
US 2021/0298246 A1  Sep. 30, 2021

Related U.S. Application Data

(60) Provisional application No. 62/757,353, filed on Nov. 8, 2018, provisional application No. 62/712,355, filed on Jul. 31, 2018.

(51) Int. Cl.
*F24F 3/00* (2006.01)
*A01G 9/24* (2006.01)
(Continued)

(52) U.S. Cl.
CPC ............ *A01G 9/246* (2013.01); *F24F 1/0083* (2019.02); *F24F 3/1417* (2013.01); *F24F 5/0035* (2013.01)

(58) Field of Classification Search
CPC ...... F24F 1/0083; F24F 5/0035; F24F 3/1417; A01G 9/246
See application file for complete search history.

(56) References Cited

U.S. PATENT DOCUMENTS 4,803,846 A   2/1989  Assaf
6,012,296 A   1/2000  Shah
(Continued)

FOREIGN PATENT DOCUMENTS

CN  103857965 A   6/2014
CN  104981282 A   10/2015
(Continued)

OTHER PUBLICATIONS

Al-Sulaiman, F.A., et al., "Liquid Desiccant Based Two-Stage Evaporative Cooling System Using Reverse Osmosis (RO) Process for Regeneration," Applied Thermal Engineering, Oct. 2007, vol. 27, Issues 14-15, pp. 2449-2454, Elsevier Ltd.
(Continued)

*Primary Examiner* — Brian M King
(74) *Attorney, Agent, or Firm* — PATENT PORTFOLIO BUILDERS PLLC

(57) ABSTRACT

A liquid desiccant system for controlling a temperature inside an enclosure includes an evaporative cooler system configured to cool an air stream AA entering the enclosure during day time; a liquid desiccant night cooler (LDNC) system configured to cool down and dry an inside air stream AE of the enclosure by using a liquid desiccant during the night; and a controller configured to switch on the LDNC system during the night.

11 Claims, 14 Drawing Sheets

Very low evaporation
Low evaporation
Normal evaporation
High evaporation
Very high evaporation
Extremely high evaporation

| RH% | Temperature °C | | | | | | | | | | | | | | | | | | |
|---|---|---|---|---|---|---|---|---|---|---|---|---|---|---|---|---|---|---|---|
| | 12 | 13 | 14 | 15 | 16 | 17 | 18 | 19 | 20 | 21 | 22 | 23 | 24 | 25 | 26 | 27 | 28 | 29 | 30 |
| 40 | 6.4 | 6.8 | 7.2 | 7.7 | 8.2 | 8.7 | 9.2 | 9.8 | 10.4 | 11.0 | 11.7 | 12.4 | 13.1 | 13.8 | 14.6 | 15.5 | 16.3 | 17.3 | 18.2 |
| 45 | 5.9 | 6.2 | 6.6 | 7.1 | 7.5 | 8.0 | 8.5 | 9.0 | 9.5 | 10.1 | 10.7 | 11.3 | 12.0 | 12.7 | 13.4 | 14.2 | 15.0 | 15.6 | 16.7 |
| 50 | 5.3 | 5.7 | 6.0 | 6.4 | 6.8 | 7.2 | 7.7 | 8.2 | 8.7 | 9.2 | 9.7 | 10.3 | 10.9 | 11.5 | 12.2 | 12.9 | 13.6 | 14.4 | 15.2 |
| 55 | 4.8 | 5.1 | 5.4 | 5.8 | 6.1 | 6.5 | 6.9 | 7.3 | 7.8 | 8.3 | 8.7 | 9.3 | 9.8 | 10.4 | 11.0 | 11.6 | 12.3 | 12.9 | 13.7 |
| 60 | 4.3 | 4.5 | 4.8 | 5.1 | 5.5 | 5.8 | 6.2 | 6.5 | 6.9 | 7.3 | 7.8 | 8.2 | 8.7 | 9.2 | 9.8 | 10.3 | 10.9 | 11.5 | 12.1 |
| 65 | 3.7 | 4.0 | 4.2 | 4.5 | 4.8 | 5.1 | 5.4 | 5.7 | 6.1 | 6.4 | 6.8 | 7.2 | 7.6 | 8.1 | 8.5 | 9.0 | 9.5 | 10.1 | 10.6 |
| 70 | 3.2 | 3.4 | 3.6 | 3.9 | 4.1 | 4.3 | 4.6 | 4.9 | 5.2 | 5.5 | 5.8 | 6.2 | 6.5 | 6.9 | 7.3 | 7.7 | 8.2 | 8.6 | 9.1 |
| 75 | 2.7 | 2.8 | 3.0 | 3.2 | 3.4 | 3.6 | 3.8 | 4.1 | 4.3 | 4.6 | 4.9 | 5.1 | 5.4 | 5.8 | 6.1 | 6.4 | 6.8 | 7.2 | 7.6 |
| 80 | 2.1 | 2.3 | 2.4 | 2.6 | 2.7 | 2.9 | 3.1 | 3.3 | 3.5 | 3.7 | 3.9 | 4.1 | 4.4 | 4.6 | 4.9 | 5.2 | 5.4 | 5.8 | 6.1 |
| 85 | 1.6 | 1.7 | 1.8 | 1.9 | 2.0 | 2.2 | 2.3 | 2.4 | 2.6 | 2.8 | 2.9 | 3.1 | 3.3 | 3.5 | 3.7 | 3.9 | 4.1 | 4.3 | 4.6 |
| 90 | 1.1 | 1.1 | 1.2 | 1.3 | 1.4 | 1.4 | 1.5 | 1.6 | 1.7 | 1.8 | 1.9 | 2.1 | 2.2 | 2.3 | 2.4 | 2.6 | 2.7 | 2.9 | 3.0 |
| 95 | 0.5 | 0.6 | 0.6 | 0.6 | 0.7 | 0.7 | 0.8 | 0.8 | 0.9 | 0.9 | 1.0 | 1.0 | 1.1 | 1.2 | 1.2 | 1.3 | 1.4 | 1.4 | 1.5 |
| 99 | 0.1 | 0.1 | 0.1 | 0.1 | 0.1 | 0.1 | 0.2 | 0.2 | 0.2 | 0.2 | 0.2 | 0.2 | 0.2 | 0.2 | 0.2 | 0.3 | 0.3 | 0.3 | 0.3 |
| 100 | - | - | - | - | - | - | - | - | - | - | - | - | - | - | - | - | - | - | - |

(51) Int. Cl.
F24F 1/0083 (2019.01)
F24F 3/14 (2006.01)
F24F 5/00 (2006.01)

(56) References Cited

U.S. PATENT DOCUMENTS

| | | | |
|---|---|---|---|
| 6,324,860 | B1 | 12/2001 | Maeda et al. |
| 6,976,365 | B2 | 12/2005 | Forkosh et al. |
| 9,423,140 | B2 | 8/2016 | Betts et al. |
| 9,568,235 | B2 | 2/2017 | Dobbs |
| 9,696,048 | B2 | 7/2017 | Goldsworthy et al. |
| 9,709,286 | B2 | 7/2017 | Vandermeulen et al. |
| 2002/0116934 | A1 | 8/2002 | Dinnage et al. |
| 2004/0031282 | A1* | 2/2004 | Kopko ............... F24S 10/60 62/271 |
| 2010/0126062 | A1* | 5/2010 | Houweling ............ A01G 9/14 47/17 |
| 2011/0283720 | A1 | 11/2011 | Martin |
| 2012/0125020 | A1* | 5/2012 | Vandermeulen .... H01L 31/0521 62/235.1 |
| 2014/0260372 | A1 | 9/2014 | Woods et al. |
| 2014/0260399 | A1 | 9/2014 | Vandermeulen |
| 2015/0260420 | A1 | 9/2015 | Forkosh |

FOREIGN PATENT DOCUMENTS

| | | |
|---|---|---|
| CN | 105588236 A | 5/2016 |
| CN | 106471315 A | 3/2017 |
| CN | 106918104 A | 7/2017 |
| CN | 114413356 A | 4/2022 |
| CO | 14064347 | 3/2014 |
| CO | 14085793 | 4/2014 |
| CO | 15072388 | 3/2015 |
| EP | 0517432 A1 | 12/1992 |
| GB | 2351345 A | 12/2000 |
| JP | 858201922 A | 11/1983 |
| JP | 2000205598 A | 7/2000 |
| JP | 2000257911 A | 9/2000 |
| JP | 2004028526 A | 1/2004 |
| JP | 2007210438 A | 8/2007 |
| JP | 2011015655 A | 1/2011 |
| JP | 2011092163 A | 5/2011 |
| JP | 2011158248 A | 8/2011 |
| JP | 2011163682 A | 8/2011 |
| JP | 2013100987 A | 5/2013 |
| JP | 2015006133 A | 1/2015 |
| JP | 2016189723 A | 11/2016 |
| JP | 2017112916 A | 6/2017 |
| JP | 2017153475 A | 9/2017 |
| JP | 2018091565 A | 6/2018 |
| JP | 6350709 B1 | 7/2018 |
| JP | 2022020870 A | 2/2022 |
| KR | 20040026242 A | 3/2004 |
| WO | 2004078322 A1 | 9/2004 |
| WO | 2011004596 A1 | 1/2011 |
| WO | 2011062808 A1 | 5/2011 |
| WO | 2016099254 A1 | 6/2016 |
| WO | 2017185002 A1 | 10/2017 |
| WO | 2019089971 A1 | 5/2019 |

OTHER PUBLICATIONS

Davies, P.A., "A Solar Cooling System for Greenhouse Food Production in Hot Climates," Solar Energy, Mar. 18, 2005, vol. 79, pp. 661-668, Elsevier Ltd.

Davies, P.A., et al., "The Seawater Greenhouse in the United Arab Emirates: Thermal Modelling and Evaluation of Design Options," Desalination, Mar. 10, 2005, vol. 173, pp. 103-111, Elsevier B.V.
El Hourani, M., et al., "Effective Desiccant Dehumidification System with Two-Stage Evaporative Cooling for Hot and Humid Climates," Energy and Buildings, Jul. 2013, vol. 68, pp. 329-338, Elsevier B.V.
International Search Report in corresponding/related International Application No. PCT/IB2019/053399, date of mailing Aug. 6, 2019.
Kassem, A.-w., S., et al., "Energy and Water Management in Evaporative Cooling Systems in Saudi Arabia," Resources, Conservation and Recycling, Nov. 1994, Issues 3-4, vol. 12, pp. 135-146, Elsevier Science B.V.
Lefers, R., et al., "Liquid Desiccant Dehumidification and Regeneration Process to Meet Cooling and Freshwater Needs of Desert Greenhouses," Desalination and Water Treatment, Apr. 19, 2016, vol. 57, pp. 23430-23442, Balaban Desalination Publications.
Lowenstein, A., "Review of Liquid Desiccant Technology for HVAC Applications," HVAC&R Research, Nov. 2008, vol. 14, No. 6, pp. 819-839.
Lychnos, G., et al., "Modelling and Experimental Verification of a Solar-Powered Liquid Desiccant Cooling System for Greenhouse Food Production in Hot Climates," Energy, Mar. 16, 2012, vol. 40, pp. 116-130, Elsevier Ltd.
Mahmud, K., et al., "Performance Testing of a Counter-Cross-Flow Run-Around Membrane Energy Exchanger (RAMEE) System for HVAC Applications," Energy and Buildings, Jul. 2010, vol. 42, Issue 7, pp. 1139-1147, Elsevier B.V.
Mohammad, A.T., et al., "Historical Review of Liquid Desiccant Evaporation Cooling Technology," Energy and Buildings, Dec. 2013, vol. 67, pp. 22-33, Elsevier B.V.
Mohammad, A.T., et al., "Survey of Hybrid Liquid Desiccant Air Conditioning Systems," Renewable and Sustainable Energy Reviews, Apr. 2013, vol. 20, pp. 186-200, Elsevier Ltd.
Paton, A.C., et al., "The Seawater Greenhouse for Arid Lands," Paper presented at: Mediterranean Conference on Renewable Energy Sources for Water Production (Santorini, Greece), Jun. 10-12, 2006, pp. 163-166.
Sabeh, N. C., "Evaluating and Minimizing Water Use by Greenhouse Evaporative Cooling Systems in a Semi-Arid Climate," Dissertation Submitted to The Faculty of the Department of Agricultural and Biosystems Engineering (Tucson, Arizona: The University of Arizona), May 2007.
Written Opinion of the International Searching Authority in corresponding/related International Application No. PCT/IB2019/053399, date of mailing Aug. 6, 2019.
First Office Action in corresponding/related Chinese Application No. 201980058472.3, dated Feb. 17, 2022.
First Examination Report in corresponding/related Saudi Arabian Application No. 521421142, dated Jun. 30, 2022.
Examination Report and Search Report in corresponding/related UAE Application No. P6000159/2021, issued Dec. 13, 2023.
Office Action in corresponding/related Colombian Application No. NC2021/0001473, dated Oct. 27, 2022.
First Examination Report (FER) in corresponding/related Indian Patent Application No. 202117005020, issued Aug. 8, 2022.
Huihui, W., et al., "Experimental Investigation on Self-Cooled Desiccant Air Conditioning System Driven by Solar Energy," Journal of HV & AC, Feb. 6, 2018, Issue 1, pp. 146-150.
Notification on Grant of Patent Right for Invention in corresponding/related Chinese Application No. 201980058472.3, Issued Aug. 16, 2022.
Notice of Reasons for Refusal in corresponding/related Japanese Application No. 2021-505420, dated Mar. 6, 2023.
Official Decision in corresponding/related Egyptian Application No. PCT 158/2021, issued May 28, 2023.

* cited by examiner

LIQUID DESSICANT COOLER SYSTEM AND METHOD

CROSS-REFERENCE TO RELATED APPLICATIONS

This application is a U.S. National Stage Application of International Application No. PCT/IB2019/053399, filed on Apr. 24, 2019, which claims priority to U.S. Provisional Patent Application No. 62/712,355, filed on Jul. 31, 2018, entitled "LIQUID DESICCANT NIGHT COOLER FOR USE IN CONTROLLED ENVIRONMENT AGRICULTURE," and U.S. Provisional Patent Application No. 62/757,353, filed on Nov. 8, 2018, entitled "LIQUID DESICCANT NIGHT COOLER (LDNC)," the disclosures of which are incorporated herein by reference in their entirety.

BACKGROUND

Technical Field

Embodiments of the subject matter disclosed herein generally relate to a liquid desiccant nigh-time air chiller and dehumidifier (LDNC) system, and more specifically, to methods and LDNC systems for controlling, together with an evaporative cooling system, an environment of an enclosure.

Discussion of the Background

Evaporative cooling is used world-wide for cooling and humidification of greenhouses in hot climates. Of special interest as it relates to fresh water and energy savings is the use of salt water resources for evaporative cooling (see, for example, Davies and Paton, 2004; Kassem, 1994; Paton and Davies, 1996; Sabeh, 2007). However, the effectiveness of the evaporative cooling is limited during periods of high humidity, as the minimum temperature achievable via traditional evaporative cooling is the wet bulb air temperature. Therefore, evaporative cooling may be an ineffective technique when cooling an enclosure that operates in high temperatures environments, as is the case for certain regions and/or during certain times of the year in the Gulf countries.

Liquid desiccants have long been proposed as a potential contributing technology to offer cooling and dehumidification for hot and humid climates. For controlled environment agriculture, liquid desiccants have been proposed in combination with evaporative cooling processes to achieve cooler temperatures (see, for example, Al-Sulaiman et al., 2007; Davies, 2005; El Hourani et al., 2014; Lefers et al., 2016; Lychnos and Davies, 2012). Liquid desiccants can also be used in combination with other forms of air cooling, including, but not limited to, mechanical vapor compression and adsorption chillers (see, Lowenstein, 2008; Mahmud et al., 2010; Mohammad et al., 2013a; Mohammad et al., 2013b).

As it relates to agriculture and controlled environment production, it has been suggested that night-time temperatures should be maintained cooler than daytime temperatures. In general, plant growers consider that high solar radiation during the day permits a crop, such as tomatoes, to tolerate and even thrive at a high temperature, for example, in the range of 27–30° C. In contrast, at night there is no solar radiation, and as such, professional growers prefer a cooler overnight temperature, with preferences in the range of 20–23° C. The exact set temperatures for day and night will vary depending on the crop type, variety, season, and grower preferences/goals.

Nocturnal high temperatures may lead to elevated energy use by the plants, and thus, excessive sugar consumption, reducing both crop yield and quality. The impact of the night temperature on crop yield and quality will vary depending upon the crop type, variety, and season.

In addition to temperature, crops are at increased risk of disease due to high humidity levels. Therefore, it is desired to control not only the temperature in the controlled environment, but also the humidity level. In this regard, FIG. 1 illustrates preferred humidity levels for plant grown in controlled environments in relation to multiple temperatures points, with temperature being more important than humidity. Note that the relative humidity RH % is defined as the ratio of the amount of water vapor in the air at a specific temperature, to the maximum amount that the air could hold at that temperature, expressed as a percentage, i.e., RH %=(absolute moisture content)/(saturated moisture content)×100%. The Humidity deficit (HD) is defined as the amount of water vapor that must be added to the air in order to achieve 100% humidity at a specific temperature, i.e., HD=(saturated moisture content—absolute moisture content) measured in $g/m^3$. FIG. 1 illustrates the humidity deficit HD at different temperatures and relative humidity. The preferred humidity set points correspond to the humidity deficit levels corresponding to the normal evaporation.

The existing evaporative cooler systems are not very efficient for maintaining one regimen of temperature and humidity during the day and another one during the night for a given enclosed environment that is located in hot and humid climates. Therefore, there is a need for a system that uses the advantages offered by an evaporative cooler system, but also improve the efficiency of such system for different regimens of humidity and temperature.

SUMMARY

According to an embodiment, there is a liquid desiccant system for controlling a temperature inside an enclosure. The system includes an evaporative cooler system configured to cool an air stream AA entering the enclosure during day time; a liquid desiccant night cooler (LDNC) system configured to cool down and dry an inside air stream AE of the enclosure by using a liquid desiccant during the night; and a controller configured to switch on the LDNC system during the night.

According to another embodiment, there is a method for cooling and removing humidity from an air stream AE inside an enclosure. The method includes a step of taking the air stream AE from the enclosure, a step of cooling and drying the air stream AE with a dehumidifier to obtain a cooled and dry air stream AF, a step of returning the cooled and dry air stream AF to the enclosure, and a step of cooling a liquid desiccant of the dehumidifier with a chiller system.

According to still another embodiment, there is a method for cooling and removing humidity from an air stream AE inside an enclosure. The method includes a step of receiving the air stream AE from the enclosure, a step of cooling the air stream AE with a chiller system to generate a cooled air stream AE', a step of removing humidity from the cooled air stream AE' with a liquid desiccant of a liquid desiccant dehumidifier, to generate a cooled and dry air stream AF, and a step of returning the cooled and dry air stream AF to the enclosure.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a greenhouse having an evaporative cooler system for use during the day and a liquid desiccant cooler and dehumidifier for use during the night. However, it is possible to use another cooling system instead of the evaporative cooler system or to run the two systems at different time intervals, not only day or night.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
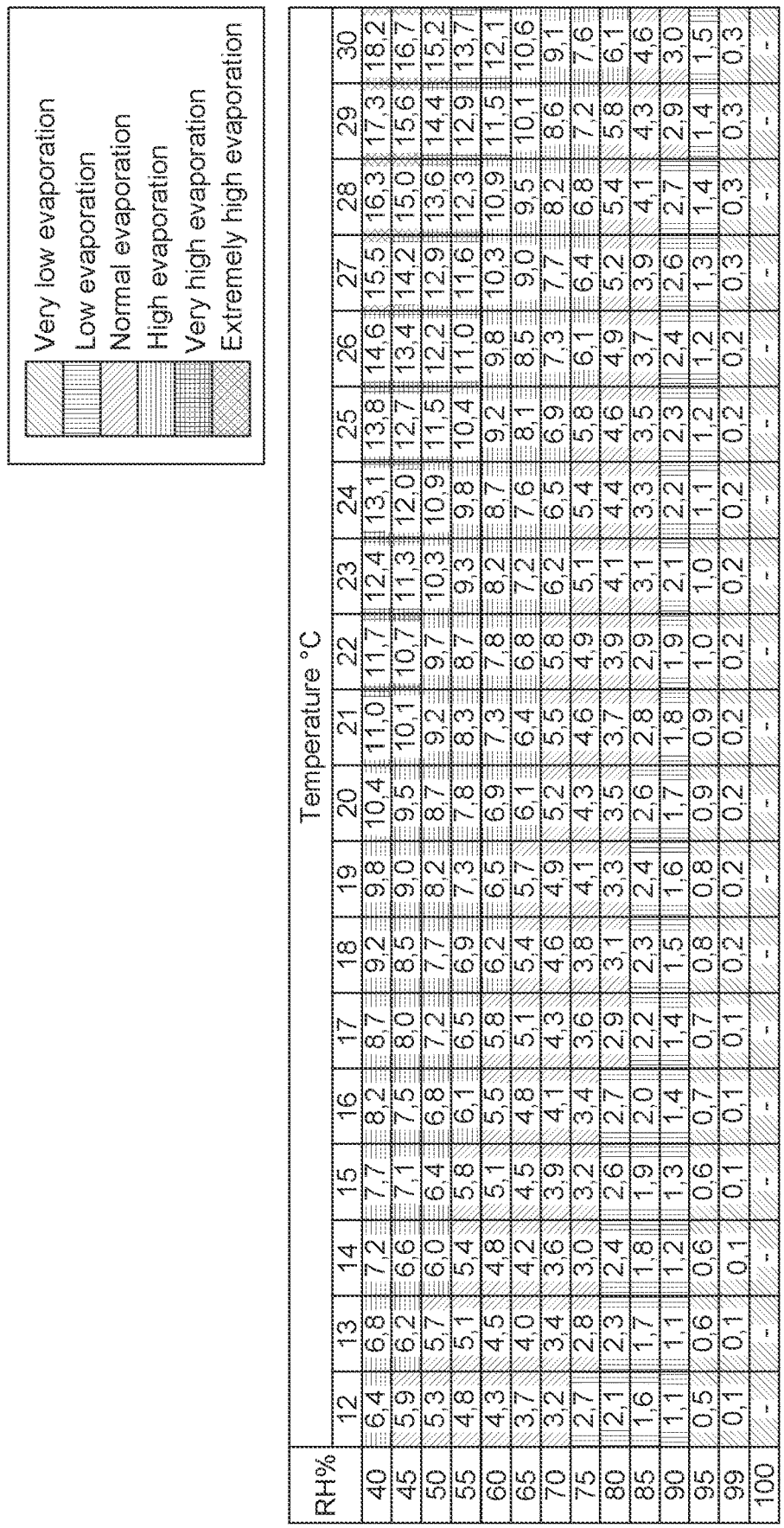
FIG. 1 illustrates a humidity deficit for plants for various temperatures and relative humidities.
Figure 2:
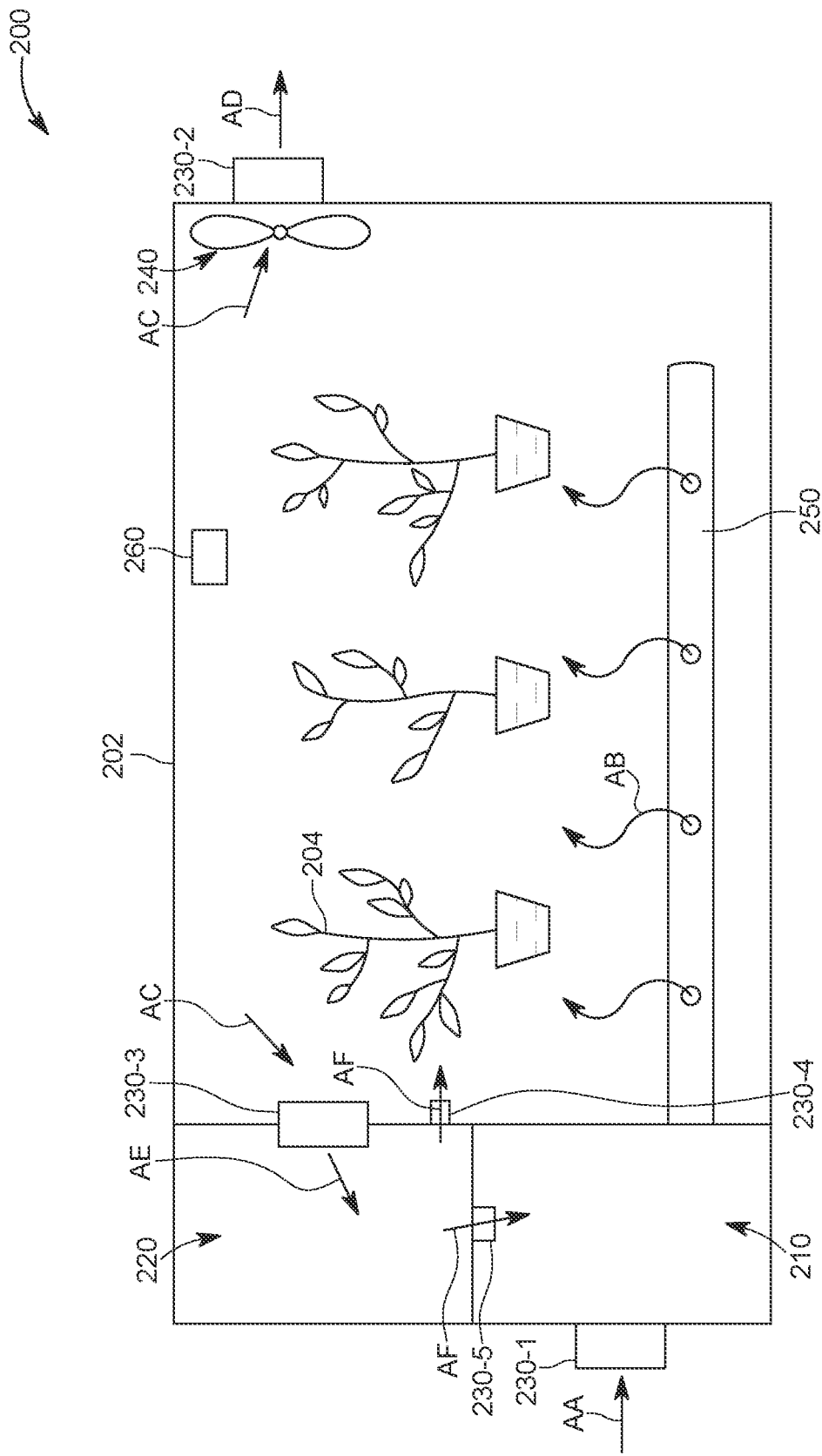
FIG. 2 illustrates an enclosure whose atmosphere is controlled with an evaporative cooler system and a liquid desiccant cooler and dehumidifier system.

According to an embodiment illustrated in FIG. 2, a temperature and humidity control system 200 includes an evaporative cooler system 210 to be used for daytime cooling and a liquid desiccant cooler and dehumidifier system (LDNC) 220 to be used for night time (note that the LDNC may also be used for daylight). During the day, an outdoor air stream AA is drawn at an inlet 230-1 into the evaporative cooling system 210, in which sensible heat (temperature) is exchanged for latent heat (humidity) through the evaporation of water. An airflow through the enclosure is induced with an air actuation system 240 (e.g., fans) and/or natural wind currents. For sustainability, it is preferred that sea or brackish water be used in the evaporative cooling process where available and accessible, to avoid the energy and carbon footprint of desalination. The cooled down air stream AB is then discharged (optionally, through a piping system 250) into the greenhouse 202. The plants 204 present in the greenhouse interact with the air stream AB, for example, by transferring humidity to the air stream through transpiration. The humid air stream AC is then forced by the fan 240 to exit the greenhouse at an output AD.

At night, the air stream AC is not discharged from the greenhouse 202, but rather it is recycled within the greenhouse 202. The recycled air stream AC is taken at an internal intake 230-3 and cooled and dehumidified by the liquid desiccant night cooler system 220 to generate a cooled and dried air stream AF. This process is also applicable in artificially-lighted agriculture systems where natural light is reduced or blocked completely (such as in a warehouse, plant factory, or vertical farm). In these systems, recycling of indoor air is desired and possible. The cooled and dry air stream AF is then either returned directly to the enclosure 202 thorough a port 230-4, or is further passed through port 230-5 to be cooled with evaporative cooler system 210, and then discharged into the enclosure 202. The air may be returned with or without piping 250.

Figure 3:
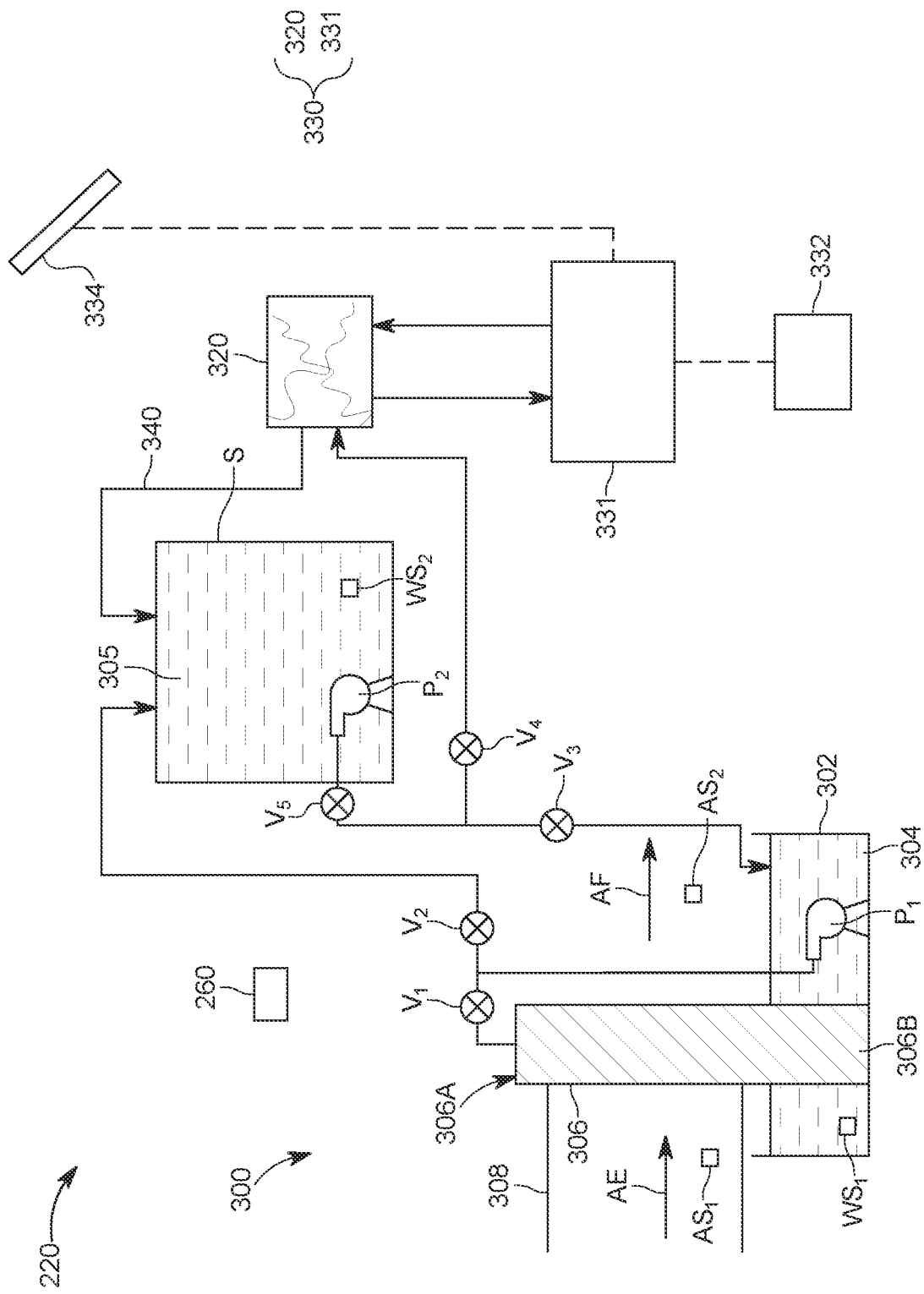
FIG. 3 illustrates a liquid desiccant cooler and dehumidifier system.

The LDNC system 220 is now discussed, in a first implementation, with regard to FIG. 3. The LDNC system includes a dehumidifier 300 that has a vessel 302 that holds a certain amount of liquid desiccant 304. A pump P1 located in the vessel 302 (note that the pump can also be located outside the vessel 302) pumps the liquid desiccant 304, through a valve V1, to a pad 306, formed of a porous material. The pad 306 has many channels that promote the movement of the incoming air stream AE through it. For example, the pad may include, but is not limited to, hollow fiber membranes, flat sheet membranes, packed media beds, cellulose pads, polypropylene pads, etc. At the same time, the liquid desiccant 304, which is released at the top 306A of the pad 306, flows due to the gravity and/or pressure through the pad, until reaching back the vessel 302. Note that the bottom 306B of the pad 306 is either located in the vessel 302 or fluidly communicating with it such that the desiccant solution returns to storage vessel 302.

As a result of the fact that the air stream AE is hot and humid, having a vapor pressure higher than a vapor pressure of the liquid desiccant 304, the interaction between the air stream AE and the liquid desiccant 304 within the pad 306 produces a drier air stream AF as humidity and heat are transferred from the air stream AE to the liquid desiccant. The air stream AF is either directly discharged into the greenhouse through port 230-4 as shown in FIG. 2, or it can be supplied to an additional system, for example, the evaporative cooler system 210, through another port 230-5, as also shown in FIG. 2. Note that a control system 260, also shown in FIG. 2, is responsible for opening or closing ports 230-4 and 230-5 as necessary. For example, based on various readings to be discussed later, the controller 260 may close port 230-3 during the day and open port 230-1 so that outside air stream AA is cooled by evaporative cooler system 210 during the day. However, during a night with undesirable climate conditions, the controller is configured to close port 203-1 so that no air stream is taken from outside the enclosure. Air stream AC is recirculated through the LDNC system 220, by opening port 230-3 and using either port 230-4 or port 230-5 for discharging the dehumidified air stream AE, either directly into the enclosure 202 or into the evaporative cooler system 210. During the night, the controller 260 also closes port 230-2 so that no air is exchanged with the outside of the enclosure. More than one additional system may be connected in series with the LDNC system 220 for further cooling the air stream AF. The additional system may be a traditional AC unit or an evaporative cooler system or another system type.

When the liquid desiccant 304 becomes weaker, i.e., its vapor pressure increases above the vapor pressure of the incoming air stream AE, and also the temperature of the liquid desiccant increases, the control system 260 may start pump P2 of a storage tank S, to bring fresh liquid desiccant 305 into the vessel 302, and also to remove some of the weak liquid desiccant 304 from the vessel 302. For this operation, the control system 260 receives liquid, density, conductivity, refractive index, temperature, and/or other readings which are converted to an equilibrium relative humidity strength of the desiccant readings from the sensor WS1 located in the liquid desiccant 304, and also humidity and temperature readings from the sensor AS1 located in the intake 308. After comparing the two measured humidities, if the vapor pressure in the liquid desiccant is higher than the vapor pressure in the incoming air stream, the control system closes valves V1 and V4, and opens valves V2 and V3 to refresh the liquid desiccant in the vessel 302. Valve V5, if present, is also opened by the control system 260 for refreshing the liquid desiccant.

FIG. 3 further shows that a heat exchanger 320, which is part of a chiller system 330, is fluidly connected to the storage tank S so that the liquid desiccant 305 can be pumped by pump P2, through valves V5 and V4 to the heat exchanger, and then back to the storage tank S. If this action takes place, the high-vapor pressure liquid desiccant 304, received by the storage tank S from the vessel 304, is cooled down in the heat exchanger 320, so that the liquid desiccant returned to the storage tank S is ready to be used again in conjunction with the pad 306. The heat exchanger 320 may use a fluid (e.g., water) from a liquid chiller 331 to cool down the liquid desiccant 304. The liquid chiller 331 may be powered from the grid 332 or from alternative energy sources, e.g., solar panels 334 installed on or next to the greenhouse, wind, diesel generators, etc.

The chiller 331 may be a variable-speed chiller connected directly to solar photovoltaics panels 334 or a single-speed chiller connected to the grid 332. All piping, storage tanks, valves, pumps, and other components may be made of corrosion resistant materials (for example, plastic). The storage tank S may include more than one tank and more than one pump. The dehumidifier 300 may include more than one unit and may include more than one pump and may be built in any configuration. Air sensors AS1 and AS2 may include, but are not limited to, temperature, relative humidity, and $CO_2$ sensors. The number of air sensors may vary. Liquid sensors WS1 and WS2 may include, but are not limited to, temperature, liquid level, conductivity, refractive index, and density sensors. The number of liquid sensors will vary. The size and type of components may also vary depending on the temperature and humidity of the environment, and also on the size of the enclosure that needs to be controlled.

Figure 4:
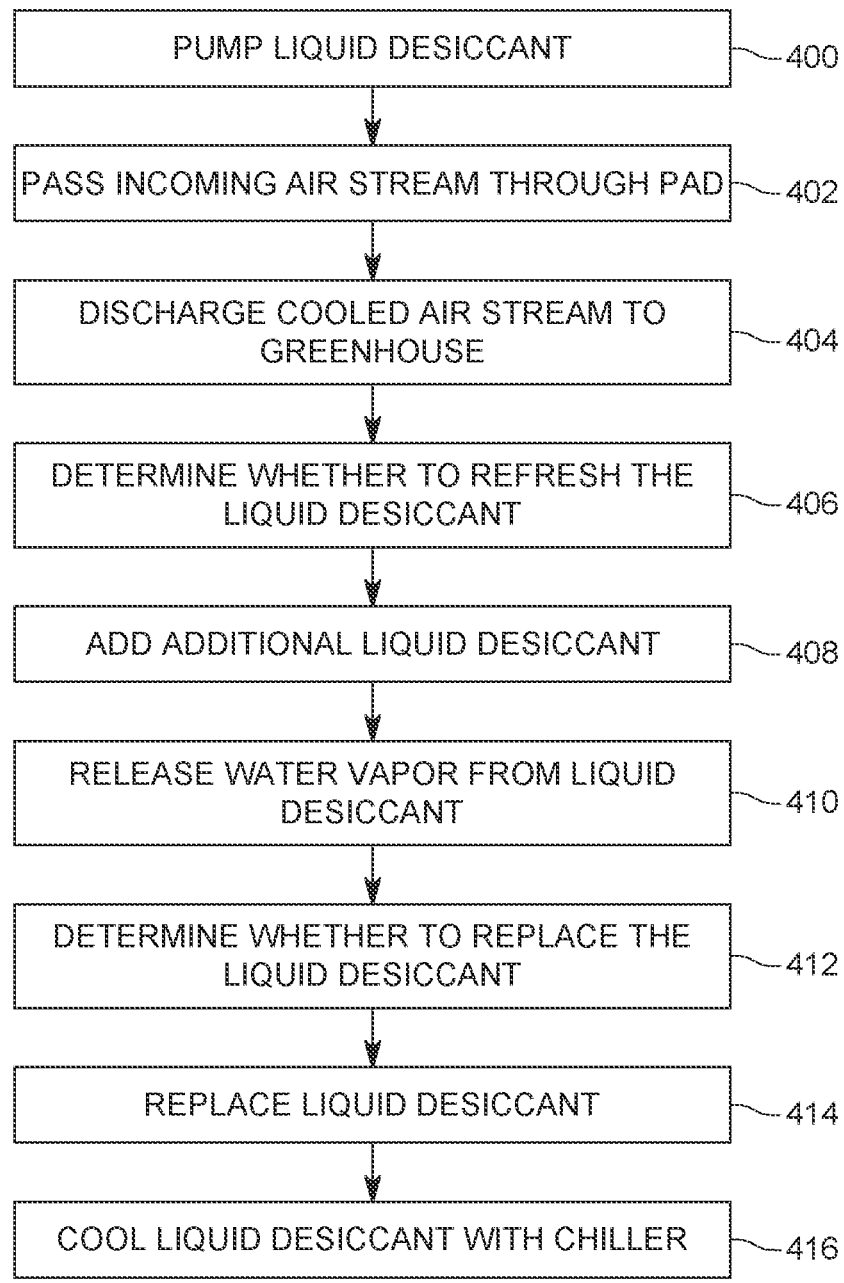
FIG. 4 is a flowchart of a method for operating the liquid desiccant cooler and dehumidifier system.

In operation, the LDNC system 220 executes the steps now discussed with regard to the flowchart shown in FIG. 4. At the beginning of the night (or any period of additional cooling/dehumidification as required in an artificially-lighted agriculture system), strong, cold (low-vapor pressure) liquid desiccant 304 is pumped in step 400, via pump P1, through valve V1 (V2 is closed) to wet the porous media pad 306 (or other heat and mass exchanger) such that the hot and humid air stream AE (may be recycled from the greenhouse) passes in step 402 through the porous media pad 306, to obtain the dried and chilled air stream AF. The dried and chilled air stream AF enters in step 404 the greenhouse directly or goes through additional cooling steps and then enters the greenhouse.

As the time goes on, the liquid desiccant 304 becomes weaker (higher vapor pressure) as the temperature of the liquid desiccant goes up as water (humidity) is absorbed into the liquid desiccant from the air stream AE. When and if a point is reached where additional cooling or dehumidification is needed beyond what the liquid desiccant 304 can provide, as determined by the control system 260 in step 406 by using liquid sensor WS1 and air sensors AS1 and AS2, additional cold and strong liquid desiccant may be added in step 408 to the system with pump P2, from storage tank S via valve V3, with V4 shut, and/or warm and weak desiccant may be pumped out of the dehumidifier 300 to storage tank S, by pump via P1, with valve V1 closed and valve V2 open.

After a certain amount of time, the liquid desiccant 304 in the vessel 302 may reach a vapor pressure higher than the incoming air stream AE. This is due to the normal diurnal swing and natural variations in temperature and relative humidity levels of the environment, where day temps tend to be higher with lower relative humidity and night temps tend to be lower with higher relative humidity while climate will also vary based upon weather patterns such as cold fronts, etc. At this time, the liquid desiccant 304 in the vessel 302 naturally switches to an evaporation mode as the vapor pressure of the liquid desiccant 304 is above the air stream AE. Thus, in step 410 the liquid desiccant releases the water vapor that was captured to cool the air, increasing the strength (lowering the vapor pressure) of the liquid desiccant. When a set density and/or vapor pressure of the liquid desiccant has been achieved, as determined in step 412 by the control system 260, based on readings from sensor WS1, the liquid desiccant 304 is cycled in step 414, by pumping it with pump P1 trough valve V2 (V1 is closed) to the storage tank S.

The liquid desiccant 305 in the thermal storage tank S is cooled by the chiller system 330 in step 416. Pump P2 moves in this step the liquid desiccant 305 from the storage tank S to the heat exchanger 320 of the chiller system 330 via valve V4, while valve V3 is shut. As the pipes 340 to/from the heat exchanger 320 (the heat exchanger may be, for example, the plate type evaporator of the mechanical cooling system) are closed, the cooled liquid desiccant 305 is naturally cycled back to the storage tank S, from the heat exchanger 320, anytime pump P2 is running with V4 open and V3 closed.

When desired, the cold liquid desiccant is pumped with pump P2 with V3 open and V4 closed to the vessel 302 and the process returns to step 400. The total amount of liquid desiccant pumped from the storage tank S will depend upon the total air cooling required by the greenhouse, as determined by sensors AS1, the strength of the liquid desiccant as determined by sensor WS2, and the capacity of the vessel 302 as determined by WS1 and initial user input.

The LDNC system 220 may be implemented in a different configuration than the one showed FIG. 2. This new configuration is now discussed with regard to FIG. 5. In this configuration, the LDNC system 220 first pre-cools the incoming air stream AE with an air chiller system 510, and then dehumidifies the resulting air stream AE' with the liquid desiccant dehumidifier 530, to obtain the drier and cooler air stream AF. For this embodiment, it is also possible that the air stream AE is be dehumidified first with the dehumidifier 530 and then cooled with the chiller system 510, i.e., the order of cooling and dehumidifying may be exchanged. The air stream AE is the indoor air stream shown in FIG. 2. However, in a modified embodiment, the outside air AA may be provided to the LDNC system 220. In one application, it is possible that the air stream AE is a combination of indoor air AC and outdoor air AA.

Figure 5:
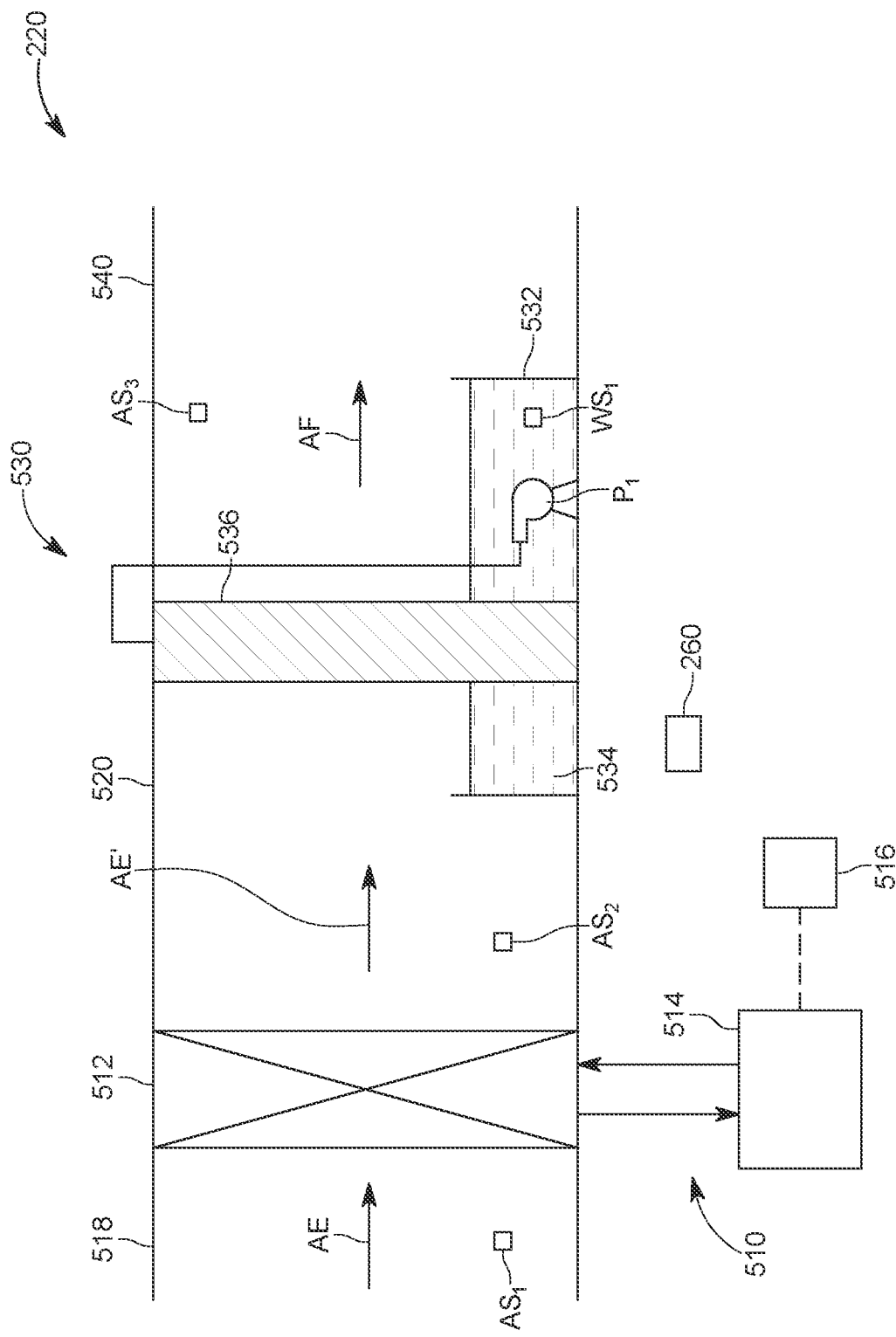
FIG. 5 illustrates another liquid desiccant cooler and dehumidifier system.

The air chiller system 510 shown in FIG. 5 includes a heat exchanger 512 and a chiller 514. A fluid (e.g., air) is exchanged between the heat exchanger 512 and the chiller 514 to cool the incoming air stream AE. The chiller 514 is connected to a power source 516, which may be the grid or an autonomous source, e.g., a solar module. The incoming air stream AE is received at an inlet 518, which directs the air to the heat exchanger 512. A sensor AS1 is placed in the inlet and configured to measure a vapor pressure of the incoming air stream AE. The readings from the sensor AS1 are sent, in a wired or wireless manner, to the controller 260. After the air stream AE has been cooled, the resulting air stream AE' advances through a conduit 520 to the dehumidifier 530. Dehumidifier 530 includes a vessel 532 that stores the liquid desiccant 534. A pad 536 (similar to pad 306) is provided with one end in the liquid desiccant 534 and with the other end extending away from the vessel 532. A pump P1 pumps the liquid desiccant 534 to the top of the pad 536 and the liquid desiccant returns to the vessel 532 through the pad, while also interacting with the air stream AE'. During this interaction, the liquid desiccant removes water vapor from the air stream AE', which results in a cooled and dry air stream AF. The air stream AF is returned through output 540 to the greenhouse 202 or to another cooling system. A sensor AS3 is placed in the output 540 for measuring the vapor pressure and a sensor WS1 is placed in the vessel 532 for measuring the vapor pressure of the liquid desiccant. All the sensors and the pump are configured to exchange information with the controller 260.

Figure 6:
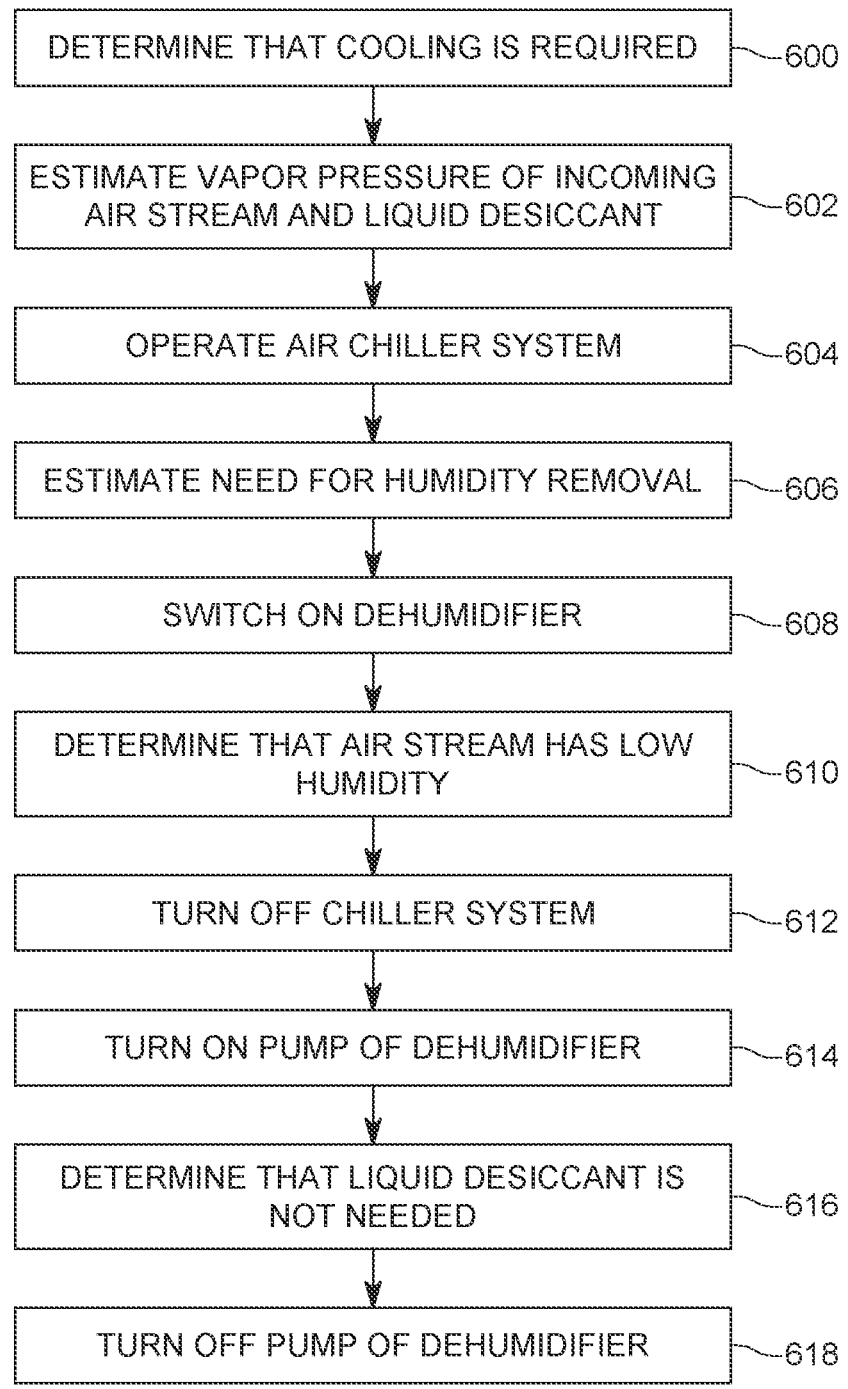
FIG. 6 is a flowchart of a method for operating the another liquid desiccant cooler and dehumidifier system.

FIG. 6 illustrates a flowchart of a method for operating the LDNC 220 as implemented in the embodiment of FIG. 5. During periods of high humidity, when cooling is required, as determined in step 600 by controller 260 based on readings from sensor AS1, if the vapor pressure of the desiccant is below that of the air, as determined in step 602 by controller 260 based on readings from sensors AS1, AS2 and WS1, the air chiller is started in step 604 to cool the incoming air stream AE. If the incoming air stream requires humidity removal, as determined in step 606 by controller 260 based on readings from the air sensors AS2 and AS3, and the liquid desiccant 534 is strong enough as determined by controller 260 based on readings from the liquid sensor WS1, the dehumidifier pump P1 is switched on in step 608. The air stream AE may require cooling, dehumidification, or a combination of both.

During periods of low humidity, when cooling is also required as determined in step 610 by controller 260 based on readings from sensor AS1, if the vapor pressure of the desiccant is above that of the air, as also determined by the controller 260 based on readings from sensors AS1 and WS1, then the chiller system 510 is turned off in step 612 and the pump P1 is turned on in step 614 to utilize the liquid desiccant based dehumidifier 530 as an evaporative cooler system. These steps recharge the liquid desiccant for later use in the dehumidifier.

During periods when the liquid desiccant is not required to be used as either an evaporative cooler or a dehumidifier, as determined by the controller 260 in step 616, based on readings from sensors AS1, AS2, AS3, and WS1, then the pump P1 is turned off in step 618.

As in the previous embodiment, the piping, pumps, and other components may be made to be corrosion resistant (for example: plastic). The dehumidifier 530 may include more units, and may include more than one pump and may be built in any configuration. The chiller may be of any type. An example chiller system that pairs well with the system 220 is an "ice box" type of chiller. In this system, solar energy may be captured via solar photovoltaic panels placed on the greenhouse, and the energy generated is directed to a variable speed compressor ice box chiller for thermal storage. The thermal storage ice box can then be used at any time for air cooling. Another chiller system that pairs well with the system 220 is a variable speed compressor air conditioner, which allows tailored sensible cooling of the air before dehumidification based upon user inputs. The chiller may include more than one unit and it may be built in any configuration.

The air sensors may include, but are not limited to, temperature, relative humidity, and $CO_2$ sensors. The number of air sensors may vary. The liquid sensors may include, but are not limited to, temperature, liquid level, conductivity, refractive index, and density sensors. The number of sensors may vary. The system 220 is preferred to be paired with an evaporative cooler for energy-efficient cooling during periods of low humidity, but this is not a requirement. For greenhouse agriculture, cooling at night may be achieved with the system described herein. For artificially-lighted agriculture, cooling during dark periods (lights off) may be achieved with the system described herein.

Figure 7:
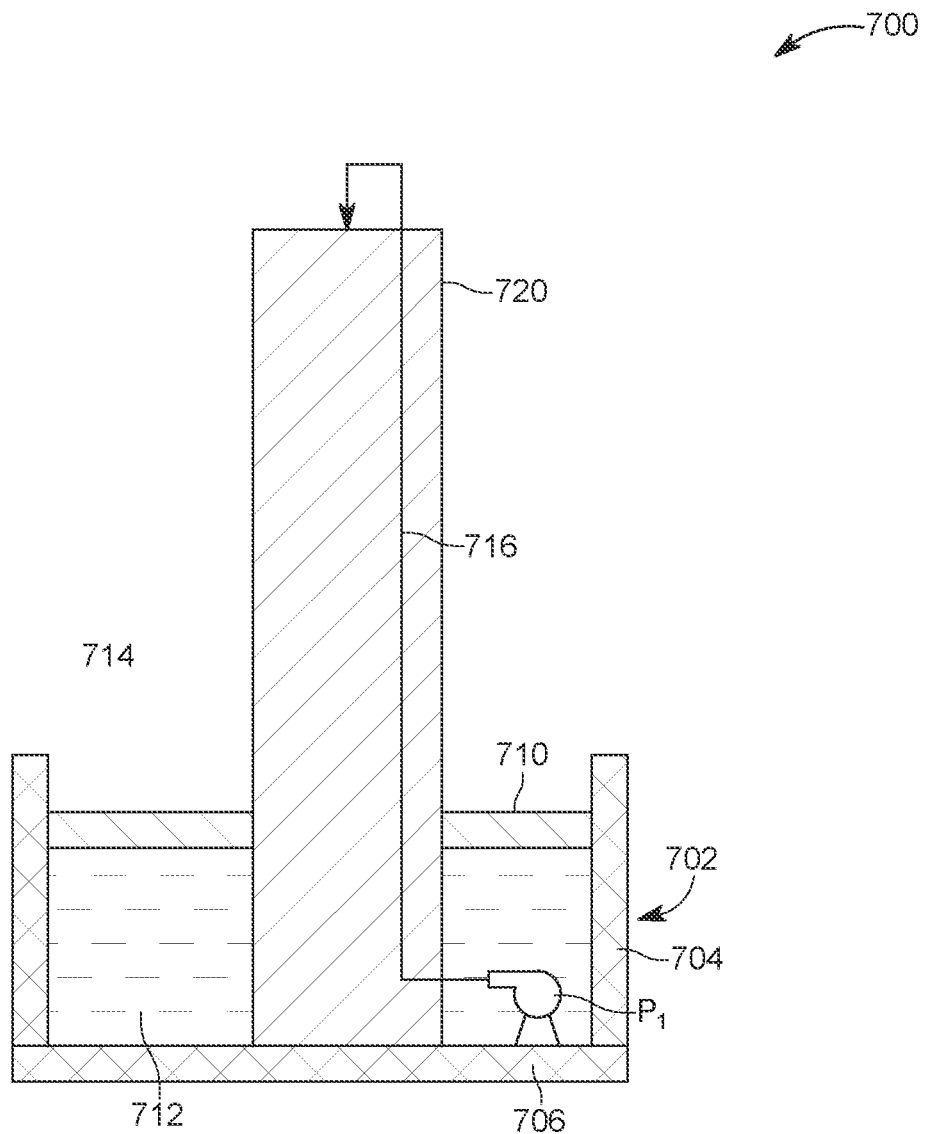
FIG. 7 illustrates a dehumidifier of the liquid desiccant cooler and dehumidifier system.

Differences between the liquid desiccant night cooler system 220 and the traditional "pad and fan" evaporative cooler include, but are not limited to, the liquid storage area (i.e., the vessel). As illustrated in FIG. 7, a dehumidifier 700, which may be dehumidifier 300 or dehumidifier 530, includes a vessel 702 which is designed to accommodate a large volume of desiccant liquid, normally, but not limited to, 300-500 liters per linear meter of pad length. This storage tank 702 is also designed to be thermally insulated from the environment, by having insulated walls 704 and bottom 706, and a floating thermal top 710, which floats on top of the liquid desiccant, to reduce to a minimum the heat exchanged between the liquid desiccant 712 and the ambient 714. FIG. 7 also shows that the pump P1 pumps the liquid desiccant 712 through a pipe 716 to the top of the pad 720. The pipe 716 is located inside the pad 720. However, the pipe may also be located outside the pad, as shown in FIGS. 3 and 5.

The volume of the vessel 702 is chosen to hold an amount of liquid desiccant needed for night dehumidification in a dry and hot climate. For example, for Jeddah, Saudi Arabia, the amount of liquid desiccant needed during night hours depends upon the setup option, i.e., (i) desiccant liquid chilling as in the embodiment of FIG. 3 or (ii) air chilling with desiccant dehumidification only, as in the embodiment of FIG. 5. When using a $MgCl_2$ desiccant solution, option (i) would require desiccant storage volumes in the order of approximately 1-2 liters per $m^3$ of controlled environment air volume. For option (ii), the desiccant storage volume can be as little as 0.1 liters of liquid desiccant per m³ of controlled environment air volume. However, for this option, it will be necessary a four times larger size chiller system due to a high peak load (including, but not limited to, during the first hour of the night air chilling.) Although option (i) requires more total volume of storage, the desiccant liquid can act as a refrigeration storage "battery," allowing for chilling of the liquid over a longer period of time and therefore, a smaller peak load and smaller overall chiller size.

For option (i), to use the liquid desiccant for air chilling and dehumidification, the liquid desiccant needs to be chilled enough to absorb the kJ of energy that are to be transferred to it from the warm and humid controlled environment air stream AC. In a modelled case, this is estimated to be about 70 kJ/m³ of controlled environment volume. Chilling the liquid desiccant with the chiller system 330 increases its dehumidification potential (lowering the vapor pressure) and also allows it to act as a heat sink (low kJ/kg of liquid desiccant). When humidity is taken from the air, the latent heat of condensation is "released" as kJ of sensible heat (temperature increase). This heat of condensation needs to be either dissipated to the air or the liquid desiccant. By chilling the liquid desiccant prior to dehumidification (removing kJ), the liquid desiccant can act as a heat sink to take these extra kJ while still cooling the air (or, at least, not warming the air).

Figure 8:
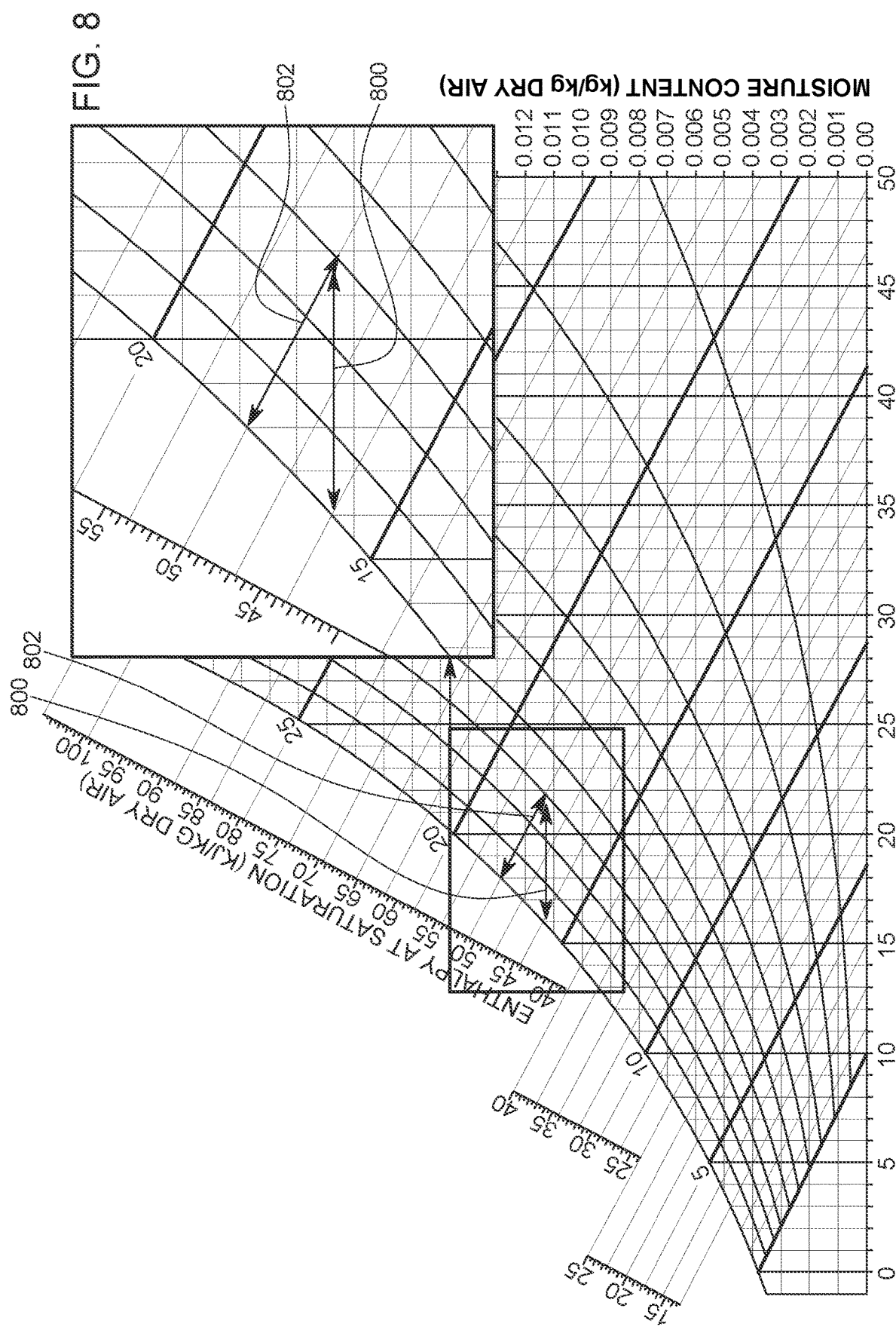
FIG. 8 is a psychrometric chart.

For option (ii), the liquid desiccant need not be cooled, as the kJ are removed from the air stream AC by the air chiller 510. The air chiller 510 is capable of cooling the air to the dew point, where the humidity is removed as the liquid water condenses from the air. However, in a chiller-alone system (no desiccant), the air chiller must overcool the air to reach its dew point and remove excess humidity. For example, if the target air temperature and relative humidity (inside the greenhouse) is 22° C. and 70% relative humidity, respectively, then the air needs first to be chilled to its dew point temperature of 16.3° C. and then, the air needs to be re-heated to move from 16.3° C. at 100% relative humidity to 22° C. and 70% relative humidity (adding ~6 kJ/kg of air), as shown by line 800 on the psychrometric chart in FIG. 8. Note that the X axis in FIG. 8 shows the temperature and the Y axis indicates the humidity. In the proposed option (ii), the air need only be cooled by the air chiller to 18.3° C. at 100% relative humidity (the wet bulb temperature). Then, the liquid desiccant can be used to naturally to exchange the humidity for temperature, as shown by line 802 on FIG. 8. Air chilling combined with a liquid desiccant for dehumidification in this case saves about 15% in terms of electric energy for cooling via the air chiller plus the additional energy for reheating. In addition, the water vapor captured into the liquid desiccant can be reused for evaporative air cooling during the day, when the liquid desiccant is regenerated, saving additional water and energy.

Regardless of whether the liquid desiccant is used for cooling via option (i) or (ii), the humidity that is absorbed into the liquid desiccant as liquid water needs to be removed in order to keep the dehumidifying potential of the liquid desiccant at its desired level. The vapor pressure of the liquid desiccant is often communicated as its equilibrium relative humidity (ERH) at the same temperature with the air. In the present embodiments, the liquid desiccant night cooler/dehumidifier system 220 is used (1) during the day as an evaporative cooler/desiccant regenerator to bring the ERH of the liquid desiccant back down to desired levels for night-time dehumidification and (2) to provide additional cooling for the controlled environment. The desired ERH of the liquid desiccant will vary, but for the modeled case in Thuwal, Saudi Arabia, the desired ERH is about 65% at the beginning of the cycle of night dehumidification and cooling. Therefore, the ambient humidity needs to drop at a value equal to or below 65% during the daytime hours to enable desiccant regeneration as the liquid water is evaporated from the liquid desiccant.

Figure 9:
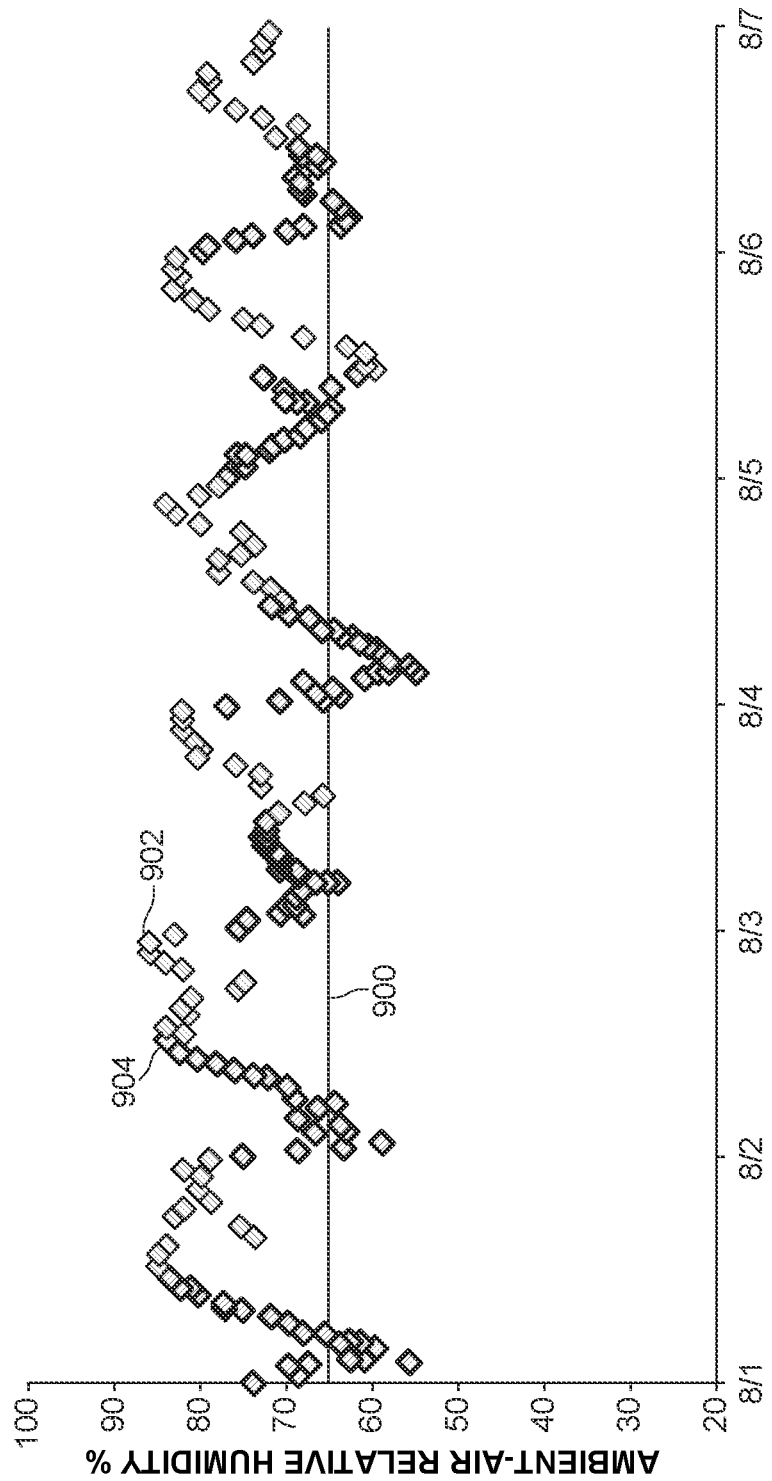
FIG. 9 illustrates a relative humidity of the air inside the enclosure for day and night, when a traditional evaporative cooler system is used.

In this regard, FIG. 9 shows how the ambient relative humidity generally varies based upon the diurnal cycle, with generally higher night humidity 902 and lower day humidity 904. FIG. 9 plots the relative humidity of the ambient air versus time, where the time corresponds to a couple of days in August. A target 900 is also plotted. It can be seen that the humidity levels drop below the desired ERH target 900 at certain times of the day during all days of the example week, allowing the liquid desiccant to be regenerated and providing additional evaporative cooling for the controlled environment.

Figure 10:
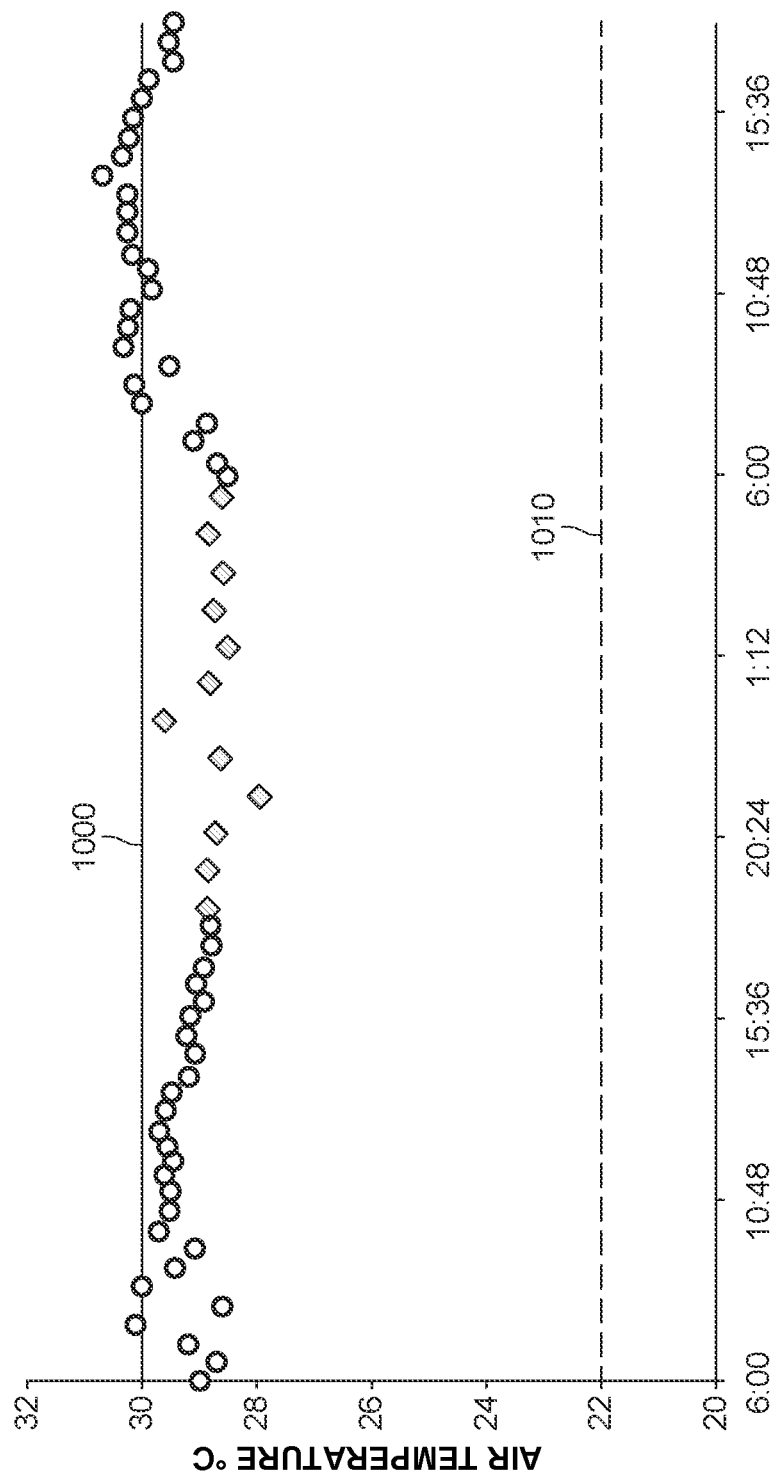
FIG. 10 illustrates the air temperature inside the enclosure for day and night when the evaporative cooler system is used.

FIG. 10 shows the indoor temperature that can be achieved with a traditional evaporative cooling system during the hot and humid month of August, using real data obtained from a seawater evaporative cooler installed in a greenhouse in Thuwal, Saudi Arabia, from Aug. 1-3, 2016. As can be seen from the figure, the evaporative cooler system is capable of meeting the temperature targets during daylight hours (round dots relating to target line 1000), but is not capable of meeting targets during night time hours (diamonds relating to target line 1010) due to the high ambient humidity (despite the reduced energy loads at night if evaporative cooling is used instead of AC/mechanical cooling).

Figure 11:
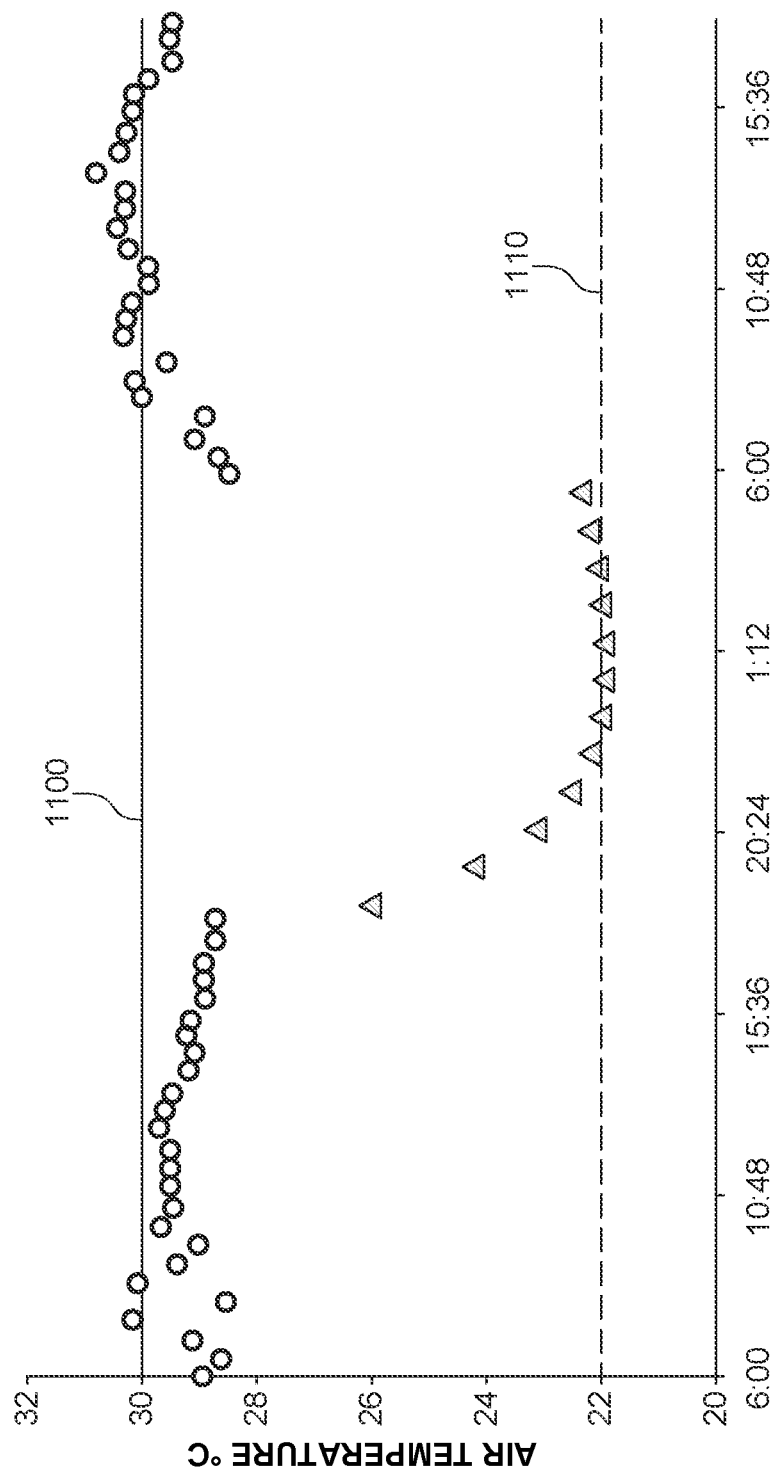
FIG. 11 illustrates the air temperature inside the enclosure for day and night when the liquid desiccant cooler and dehumidifier system is used.

However, when the same enclosure under the same conditions is cooled with the system 220 discussed above, because the LDNC system 220 combines liquid desiccants with other forms of cooling, both daytime (dots) and night time (triangles) temperature targets can be met (see target air temperature for day 1100 and night 1110 in FIG. 11) for the cultivation of crops in controlled environments with minimal extra grid energy consumption. FIG. 11 illustrates an example of theoretical temperatures from developed models that can be achieved by combining a liquid desiccant night cooling system with a daytime saltwater evaporative cooler using input data from the Aug. 1-2, 2016 experiment illustrated in FIG. 10.

Figure 12:
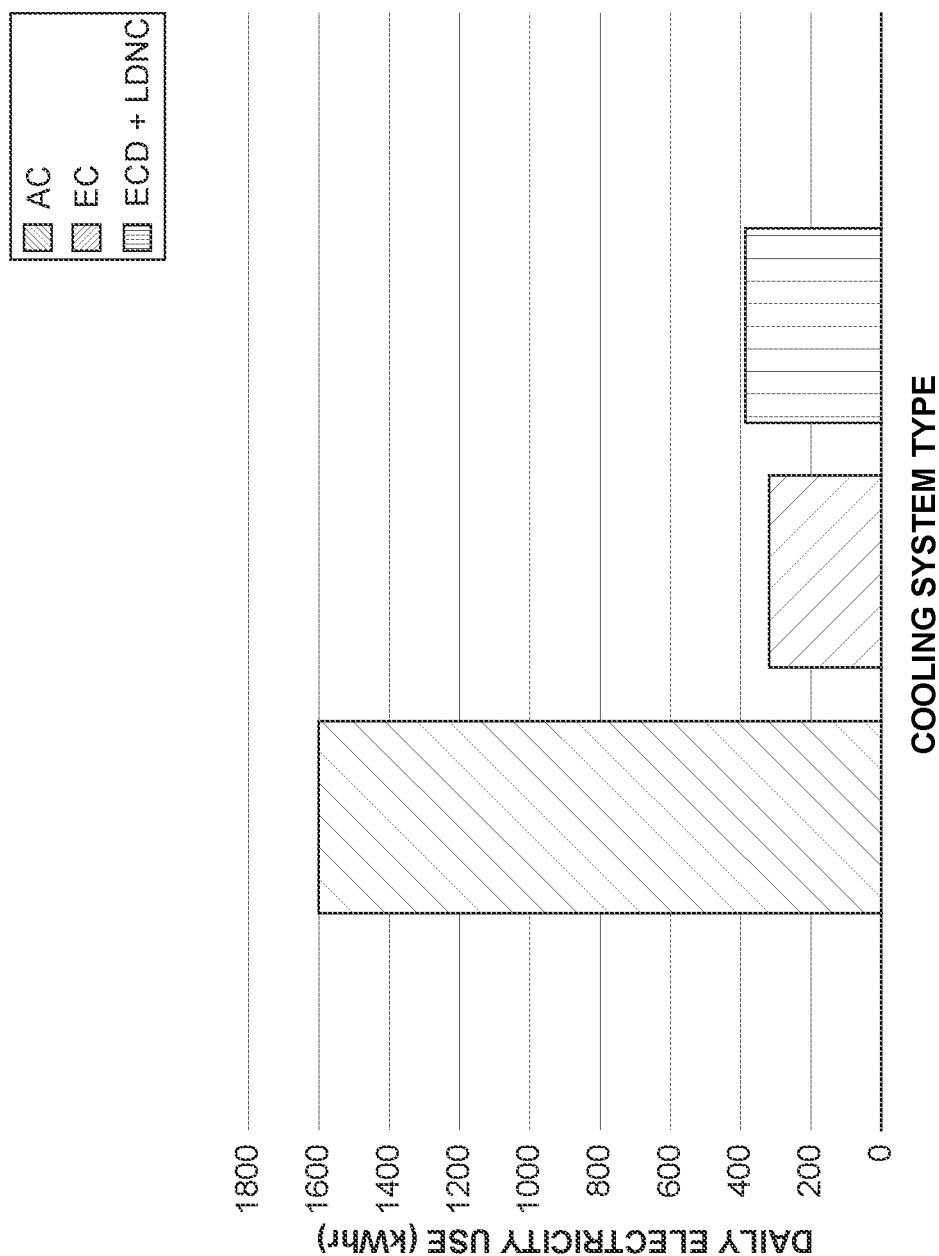
FIG. 12 illustrates the energy consumption of a traditional AC system, a traditional evaporative cooler system, and an evaporative cooler system and the liquid desiccant cooler and dehumidifier system.

FIG. 12 shows the estimated daily electric energy consumption for three types of cooling systems for a 2,000 m² glass greenhouse in Thuwal, Saudi Arabia for the time period of Aug. 1, 2016. The first system is a traditional mechanical vapor compression system used all day (air conditioner=AC). The temperatures achieved are as those shown for daytime evaporative cooling with night liquid desiccant in FIG. 11. The second system is a traditional evaporative cooler system used all day and assuming no desalination of input water (the achievable temperatures are shown in FIG. 10). The third system is an evaporative cooler for day use (ECD) combined with a liquid desiccant night cooler (LDNC 220) and the achievable temperatures are shown in FIG. 11.

The ECD+LDNC system using option (i) configuration with solar PV connected to the chiller system saves significant grid electrical energy consumption when compared to the traditional AC (AC ~4× more), and only consumes slightly more grid electrical energy than an evaporative cooler operating all day (~1.2× more) while meeting plant grower desires for extra cooling at night, as illustrated in FIG. 12. In terms of the estimated monthly operating expense, the expected electrical OPEXs are: AC=$3,860; stand-alone EC=$770; and ECD+LDNC=$930 (assuming electricity tariff of $0.08/kWh). Assuming a farm gate price of $5/kg of vegetables produced, the greenhouse would need to produce 3.6 kg/m²/yr more with the AC than with the EC to justify the added OPEX, while the greenhouse need only produce 0.2 kg/m²/yr more with the ECD+LDNC to justify the added OPEX. Therefore, the ECD+LDNC holds great promise for efficiently cooling the greenhouse such that production and profit can be increased above what would be achievable with traditional evaporative cooling alone in hot and humid climates.

The ECD+LDNC system is expected to meet grower-desired set points for temperature and humidity for controlled environment agriculture in hot and humid climates with a significantly lower energy footprint than what might be achieved with traditional AC cooling. As such, the LDNC system disclosed herein holds great potential for increasing product quantity and quality with a lower energy and cost footprint, and therefore also will increase the income from and sustainability of controlled environment agriculture for growers in these climates.

Figure 13:
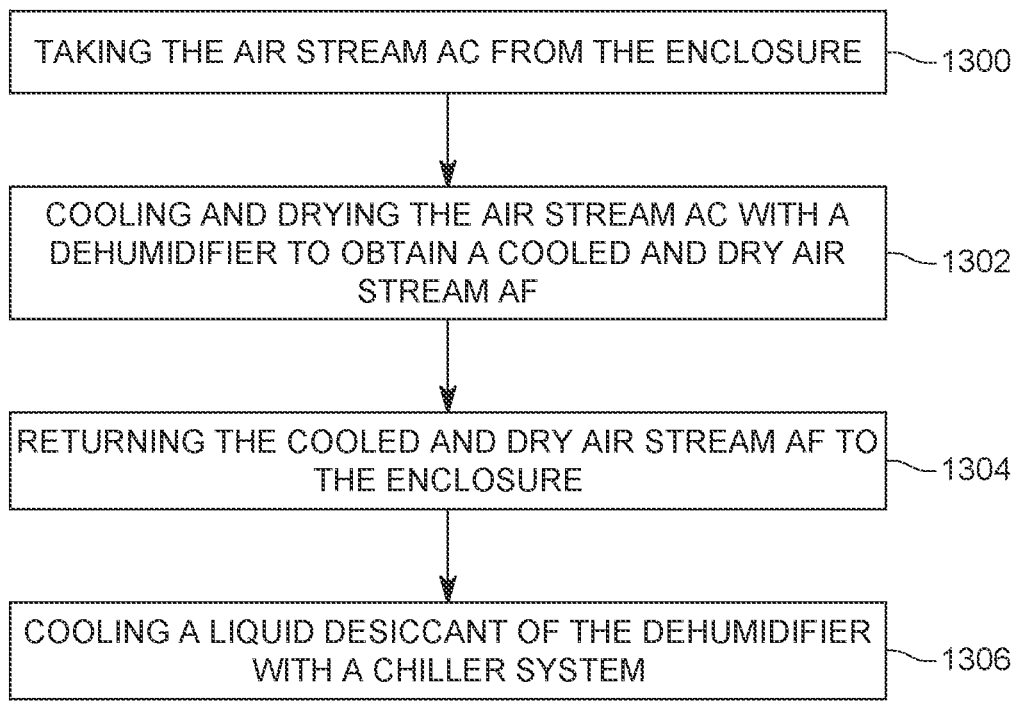
FIG. 13 is a flowchart of a method for running the liquid desiccant cooler and dehumidifier system.

A method for implementing option (i) is now discussed with regard to FIG. 13. The method includes a step 1300 of taking the air stream AE from the enclosure, a step 1302 of cooling and drying the air stream AE with a dehumidifier 300 to obtain a cooled and dry air stream AF, a step 1304 of returning the cooled and dry air stream AF to the enclosure, and a step 1306 of cooling a liquid desiccant of the dehumidifier 300 with a chiller system. The method may further include a step of closing, over the night, ports that allow outside air to enter the enclosure and inside air to escape from the enclosure, and/or a step of processing the cooled and dry air stream AF with an evaporative cooler system before returning it to the enclosure. A controller 260 (e.g., a processor) decides when to close or open the ports, and to start or stop the dehumidifier and the evaporative cooler system, based on vapor pressure readings from the air stream AE, and the liquid desiccant.

Figure 14:
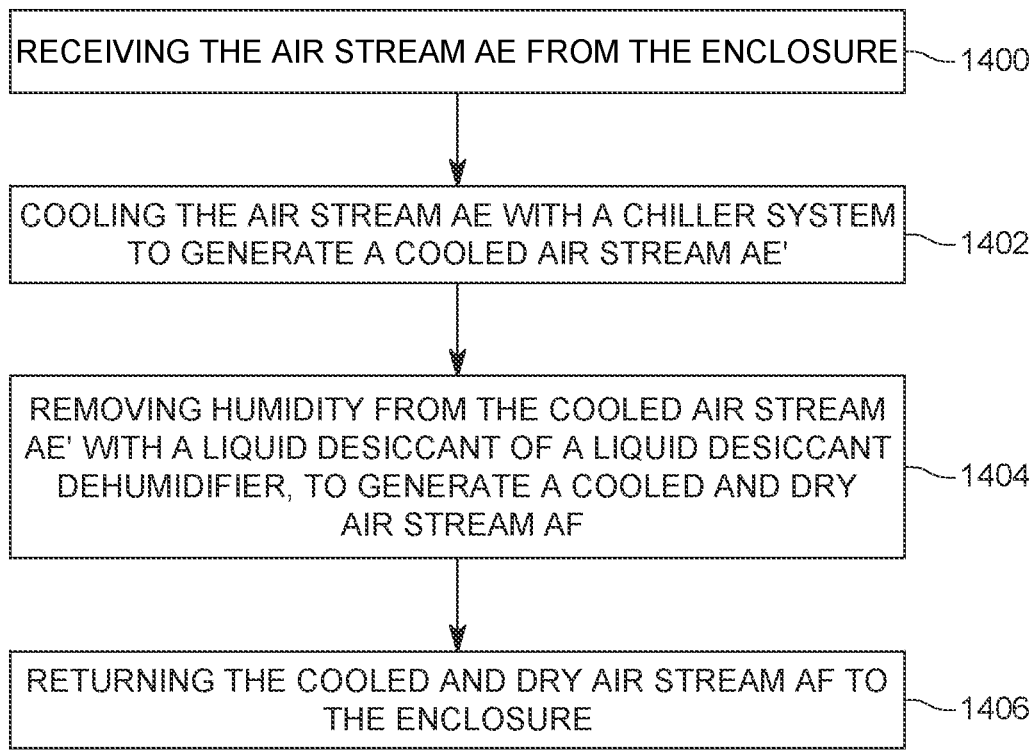
FIG. 14 is a flowchart of a method for running the other liquid desiccant cooler and dehumidifier system.

A method for implementing option (ii) is now discussed with regard to FIG. 14. The method includes a step 1400 of receiving the air stream AE from the enclosure, a step 1402 of cooling the air stream AE with a chiller system 510 to generate a cooled air stream AE', a step 1404 of removing humidity from the cooled air stream AE' with a liquid desiccant of a liquid desiccant dehumidifier 530, to generate a cooled and dry air stream AF, and a step 1406 of returning the cooled and dry air stream AF to the enclosure.

The method may further include a step of closing, over the night, ports that allow outside air to enter the enclosure and inside air to escape from the enclosure, and/or a step of processing the cooled and dry air stream AF with an evaporative cooler system before returning it to the enclosure. Controller 260 decides when to close or open the ports, and to start or stop the liquid desiccant dehumidifier and the evaporative cooler system, based on vapor pressure readings from the air stream AE, and the liquid desiccant.

The disclosed embodiments provide a liquid desiccant cooler and dehumidifier system that may be used during the night time in an enclosure for achieving a desired temperature and/or humidity. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Al-Sulaiman, F. A., Gandhidasan, P., and Zubair, S. M. (2007). Liquid desiccant based two-stage evaporative cooling system using reverse osmosis (RO) process for regeneration. Applied Thermal Engineering 27, 2449-2454.

Davies, P., and Paton, C. (2004). The Seawater Greenhouse in the United Arab Emirates: Thermal Modelling and Evaluation of Design Options. Desalination 173, 103-111.

Davies, P. A. (2005). A solar cooling system for greenhouse food production in hot climates. Solar Energy 79, 661-668.

El Hourani, M., Ghali, K., and Ghaddar, N. (2014). Effective desiccant dehumidification system with two-stage evaporative cooling for hot and humid climates. Energy and Buildings 68, 329-338.

Kassem, A. S. (1994). Energy and water management in evaporative cooling systems in Saudi Arabia. Resources, Conservation and Recycling 12, 135-146.

Lefers, R., Bettahalli, N. M. S., Nunes, S. P., Fedoroff, N., Davies, P. A., and Leiknes, T. (2016). Liquid desiccant dehumidification and regeneration process to meet cooling and freshwater needs of desert greenhouses. Desalination and Water Treatment 57, 23430-23442.

Lowenstein, A. (2008). Review of Liquid Desiccant Technology for HVAC Applications. Hvac&R Research 14, 819-839.

Lychnos, G., and Davies, P. A. (2012). Modelling and experimental verification of a solar-powered liquid desiccant cooling system for greenhouse food production in hot climates. Energy 40, 116-130.

Mahmud, K., Mahmood, G. I., Simonson, C. J., and Besant, R. W. (2010). Performance testing of a counter-cross-flow run-around membrane energy exchanger (RAMEE) system for HVAC applications. Energy and Buildings 42, 1139-1147.

Mohammad, A. T., Bin Mat, S., Sulaiman, M. Y., Sopian, K., and Al-abidi, A. A. (2013a). Survey of hybrid liquid desiccant air conditioning systems. Renewable and Sustainable Energy Reviews 20, 186-200.

Mohammad, A. T., Mat, S. B., Sulaiman, M. Y., Sopian, K., and Al-Abidi, A. A. (2013b). Historical review of liquid desiccant evaporation cooling technology. Energy and Buildings 67, 22-33.

Paton, C., and Davies, P. (1996). The Seawater Greenhouse for Arid Lands. Paper presented at: Mediterranean Conference on Renewable Energy Sources for Water Production (Santorini, Greece).

Sabeh, N.C. (2007). Evaluating and Minimizing Water Use by Greenhouse Evaporative Cooling Systems in a Semi-Arid Climate. In Department of Agricultural and Biosystems Engineering (Tucson, Ariz.: The University of Arizona).

What is claimed is:

1. A liquid desiccant system for controlling a temperature inside an enclosure, the system comprising:
   an evaporative cooler system configured to cool an air stream AA entering the enclosure during day time;
   a liquid desiccant night cooler (LDNC) system configured to cool down and dry an inside air stream AE of the enclosure by using a liquid desiccant during the night; and
   a controller configured to switch on the LDNC system during the night.

2. The system of claim 1, wherein the controller is configured to turn on a first port during the day, for receiving the air stream AA from outside the enclosure, and to turn off the first port during the night.

3. The system of claim 2, wherein the controller is further configured to expel an air stream AC of the enclosure through a second port, outside the enclosure during the day, and to recirculate the air stream AC during the night, through the LDNC system, by closing the second port and opening a third port located between the enclosure and the LDNC system.

4. The system of claim 3, wherein the controller is further configured to open a fourth port to discharge the air stream AE cooled by the LDNC system, back into the enclosure, and to close a fifth port to prevent the air stream AE to enter the evaporative cooler system.

5. The system of claim 3, wherein the controller is further configured to close a fourth port to not discharge the air stream AE cooled by the LDNC system, back into the enclosure, and to open a fifth port to direct the air stream AE to enter the evaporative cooler system for further cooling.

6. The system of claim 1, wherein the LDNC system comprises:
   a vessel holding the liquid desiccant;
   a pad having one end in fluid contact with the liquid desiccant; and
   a pump (P1) that pumps the liquid desiccant to another end of the pad, to cool and dry the air stream AA that is incoming on the pad.

7. The system of claim 6, wherein the LDNC system further comprising:
   a storage tank S holding the liquid desiccant and being in fluid communication with the vessel;
   a chiller system that cools the liquid desiccant from the storage tank.

8. The system of claim 7, wherein the chiller system comprises:
   a heat exchanger configured to cool the liquid desiccant from the storage tank; and
   a chiller configured to remove heat from the heat exchanger.

9. The system of claim 1, wherein the LDNC system comprises:
   a chiller system for cooling the inside air stream AE; and
   a dehumidifier configured to receive a cooled air stream AE' from the chiller system and to remove humidity to generate an air stream AF, which is returned back to the enclosure.

10. The system of claim 9, wherein the dehumidifier comprises:
    a vessel holding the liquid desiccant;
    a pad having one end in fluid communication with the liquid desiccant; and
    a pump (P1) that pumps the liquid desiccant to another end of the pad, to dry the air stream AE' that is incoming on the pad.

11. The system of claim 9, wherein the chiller system comprises:
    a heat exchanger configured to cool the air stream AE; and
    a chiller configured to remove heat from the heat exchanger.

* * * * *